United States Patent [19]
Poznansky et al.

[11] Patent Number: 5,413,396
[45] Date of Patent: May 9, 1995

[54] VEHICLE PROTECTIVE COVER

[75] Inventors: Vlad Poznansky, 9/14 Hadekel, Karmiel; Igor Goldberg, Yokneam Ilit, both of Israel

[73] Assignee: Vlad Poznansky, Karmiel, Israel

[21] Appl. No.: 261,075

[22] Filed: Jun. 16, 1994

[51] Int. Cl.⁶ ............................................... B60J 11/00
[52] U.S. Cl. .................................... 296/136; 150/166; 160/370.23
[58] Field of Search ............ 296/136, 95.1, 97.8, 296/98; 150/166, 168; 160/370.2 R, 370.2 A, 370.2 B, DIG. 4

[56] References Cited

U.S. PATENT DOCUMENTS

| | | | |
|---|---|---|---|
| 4,889,171 | 12/1989 | Minimo | 296/95.1 X |
| 4,951,993 | 8/1990 | Taboada | 150/166 X |
| 4,958,881 | 9/1990 | Piros | 296/136 X |
| 5,188,417 | 2/1993 | Curchod | 150/166 X |

FOREIGN PATENT DOCUMENTS

| | | | |
|---|---|---|---|
| 3736234 | 5/1989 | Germany | 296/95.1 |
| 60422 | 3/1989 | Japan | 296/136 |

*Primary Examiner*—Dean J. Kramer
*Attorney, Agent, or Firm*—Mark M. Friedman

[57] ABSTRACT

A protective cover for a motor vehicle, particularly for a motorcar, in the form of a strip of a length commensurate with the length of the motorcar and of a width slightly smaller than the width of the baggage compartment of the motorcar. The cover includes a number of stiff rectangular panels connected along their long sides by flexible joints, which permits the cover to be folded into a close stack, to be stored inside the baggage compartment of the motorcar and to be pulled out and to be stretched over the body of the motorcar. The strip is provided with a mechanism for attaching its near end to the inside of the baggage compartment and a mechanism for attaching its far end to the front of the motorcar. The cover further includes two lengths of strip or string having their two ends attached to points proximate two corners of each pair of panels, the strip being of a length commensurate with the distance between the points on the panels in the fully stretched state of the cover. The cover further includes elastic members connecting the centers of each two lengths of strip or string adapted to pull the two strips or strings towards the center line of the cover and thereby pull each pair of panels into mutual contact and all the panels of the cover into a close stack.

13 Claims, 3 Drawing Sheets

VEHICLE PROTECTIVE COVER

BACKGROUND OF THE INVENTION

The invention relates to a removable cover for a vehicle, more particularly to a motor car provided with baggage compartment. It is destined to protect the body of a motor car from harsh climatic conditions including sun, rain, chemical fallout, pollution, dust, snow, hall and sleet. The cover is, during non-use, stored in the baggage compartment or boot, generally positioned in the rear of the vehicle, while occupying a minimum of space, and is readily pulled out of this boot and stretched over the car body during parking.

There exist various types of car covers, which are mostly made of canvas or similar material, and which are stowed away in a suitable place in the car in folded state. Other covers are rolled up on a rotatable shaft which is either mounted in the front or the rear of the car, either outside or in the baggage compartment where it occupies some otherwise valuable space. Still other covers are in tent shape and are mounted on poles with a view to covering the entire car, both roof and sides.

In semi-arid countries it is usually not so important to protect the entire car body against climatic conditions, but to protect the interior from being heated to almost unsupportable temperatures, while the car is parked and exposed to direct sun radiation. Since the sun stands close to the zenith during summer, it is important that the roof is protected from direct sun rays, while the sides are much less exposed and need less protection. Now, the known canvas covers are closely stretched over the roof surface without leaving an air space, whereby the radiation is directly transmitted to the metal roof and into the car interior, thus not greatly alleviating the heating action, especially after a few hours of parking.

It is, therefore, the object of the present invention to provide a car cover which is readily pulled out of the baggage compartment, where it is usually stored, and stretched over the car roof, leaving a sufficiently wide air space between the metal surface and the cover, thus preventing the sun rays from reaching this surface.

It is a further object to provide a roof cover which folds automatically into closed position, as soon as it is released and slips back into the baggage compartment, where it occupies a minimum of space.

It is still another object to provide a car cover permitting the owner to mount it himself or herself in the baggage compartment without outside help and to adjust it over the car whenever needed.

And it is a final object to make provision for optional attachment of side curtains to the roof cover for the protection of the car sides.

SUMMARY OF THE INVENTION

In a first embodiment the car protective cover is in the form of a strip of a length adequate for covering a motor car composed of a plurality of rectangular stiff panels attached to each other along their long sides by flexible joints. One end of the strip is attached to the inside of the baggage compartment in which the cover is stored while the panels are folded into a stack from where it can be pulled out by its other end and stretched over the body and the windshield of the car and tied by connecting means to the front end, as e.g. the bumper. Each two panels are interconnected on points close to their opposite corners by one thin strip or string each of a length permitting stretching of the cover strip; the two strings of each pair of panels are at their centers connected by a length of elastic band or tension spring which is fully stretched as long as the cover is pulled out over the car body, and which, when the cover end is released, contracts and pulls the two strings together to effect complete approach of each two panels and complete folding of the cover into a close stack.

The panels are preferably made of a stiff plastic material which are jointed along their long sides by flexible strips of a soft material such as plastic. Instead of providing separate jointing material, evenly spaced furrows may be pressed across a long strip of a stiff plastic material at distances corresponding to the width of the panels, which form flexible joints and permit folding of adjoining panels along these joints.

Alternatively, the cover may be composed of a long strip of flexible material with hard panels glued or otherwise attached to it, whereby the flexible material in the short spaces left between adjoining panels serves as joints.

The strings may be in the form of separate lengths having their respective ends connected to the corners of adjoining panels, or there may be two long strings extending through perforations at the ends of each panel and connected by lengths of elastic bands or tension springs between each pair of panels. In order to obtain equal folding of each panel pair, beads or knobs are preferably attached to the strings between each two perforations on adjoining panels, whereby the two strings are divided into equal parts. The strings extend beyond both ends of the plastic strip and serve for fastening one end of the cover in the baggage compartment, and for fastening the other end to the front end of the car, after the cover has been stretched over the car body.

Owing to the fact that the width of the cover is necessarily slightly less than the width of the compartment, a small portion of the roof along its edges will still be exposed to sun radiation. To remedy this omission and to cover both the entire roof as well as at least parts of the car sides, curtains may be attached to the short sides of the panels which hang down from the roof when the cover is stretched out and are packed into the baggage compartment for storage.

DETAILED DESCRIPTION OF THE DRAWINGS

Figure 1:
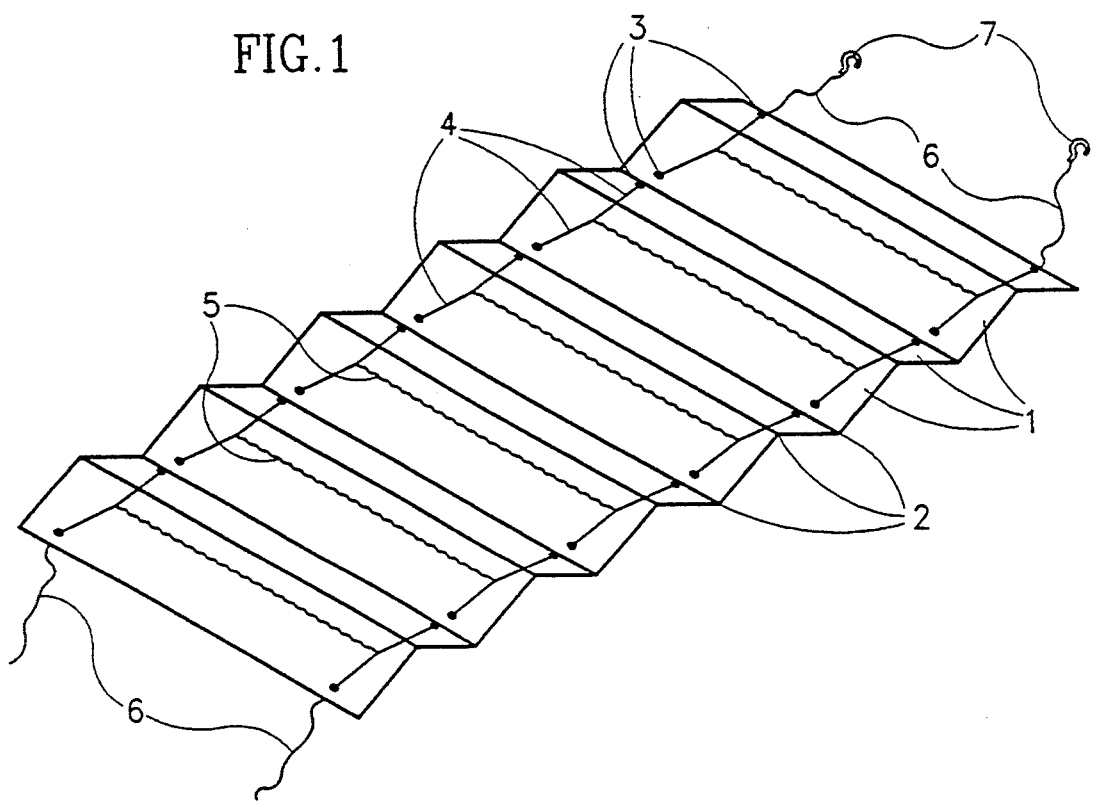
FIG. 1 is an isometric view of the underside of the car cover, in fully stretched state.
Figure 2:
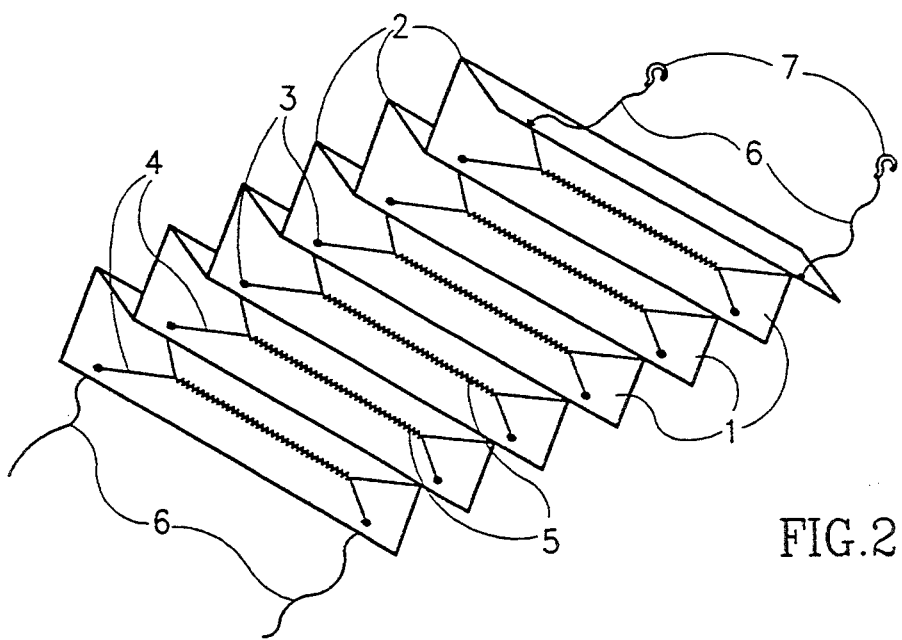
FIG. 2 is an isometric view of the underside of the car cover in partly folded state.

FIGS. 1 and 2 show the underside of the cover while it is stretched out by pull at its one end and while it is partly released and contracted, respectively. The cover is of a width commensurate with the width of the baggage compartment in which it is stored and comprises a plurality—in the present case twelve—rectangular stiff panels 1 which are connected along their long sides by flexible joints 2. These joints are either in the form of strips of a flexible material glued to the panel edges or are furrows pressed into the plastic material across the width of the cover and permit complete folding of the individual panels one upon the other, into a firm stack to be placed into the baggage compartment. Every two adjoining panels are furthermore connected at points 3 close to their opposite corners by two long strings or thin strips 4 passing through perforations in the panels at the points 3, of a length permitting the cover to be stretched over the car while the panels form obtuse angles. The two strings are divided into equal lengths by fastening means shown in FIGS. 6 and 7 and are connected in the center of each length between the two panels connected thereby, by a piece of an elastic band or tension spring 5 which is fully extended when the cover is stretched over the car as seen in FIG. 1, and which contracts when the cover end is released and pulls the two strings 4 together, thereby pulling the two panels 1 into contact. FIG. 2 shows the cover partly folded up. Since the same effect occurs for every two interconnected panels of the cover strip, all panels are eventually stacked into a common pack and are pulled into the baggage compartment.

The ends of the cover are provided with lenghts of strings or ribbons 6 which permit their tying and attaching the cover to the inside of the baggage compartment and to the bumper or any other part in the front of the car.

Figure 3:
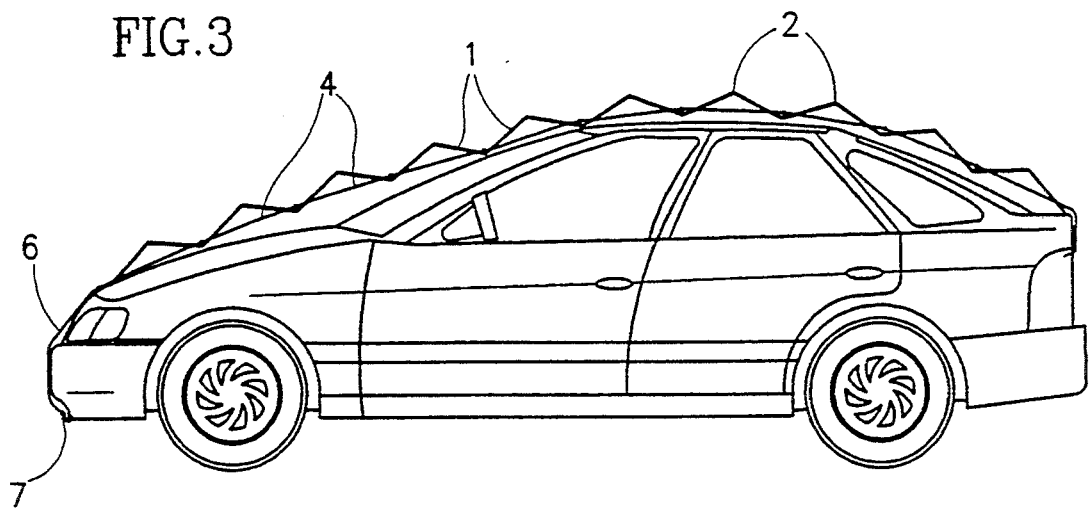
FIG. 3 is a side view of a motor car showing the cover stretched over its roof and front portion.

FIG. 3 illustrates a car with a cover of the invention stretched over its entire length and tied to the bumper by means of strings 6 and hooks 7.

Figure 4:
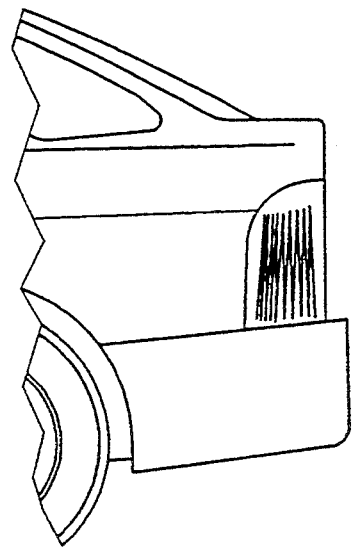
FIG. 4 is a side view of the motor car of FIG. 3, showing the cover stacked inside the baggage compartment.

FIG. 4 shows the cover folded into a tight stack and stored close to the rear wall of the baggage compartment.

Figure 5:
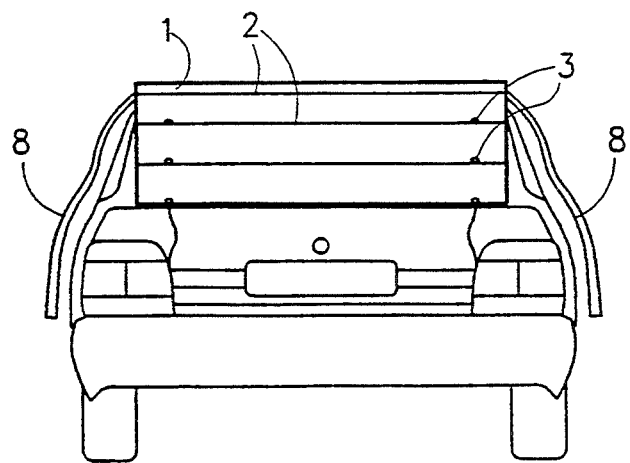
FIG. 5 is a rear view of the car of FIG. 3, showing a car cover provided with side curtains.

FIG. 5 is a rear view of the car and the cover shown in FIG. 3, as well as optional curtains 8 attached to the outer edges of panels 1. The curtains cover the edges of the roof as well as the sides and windows of the car and protect these from the effects of the climate and primarily against heating by sun radiation.

Figure 6:
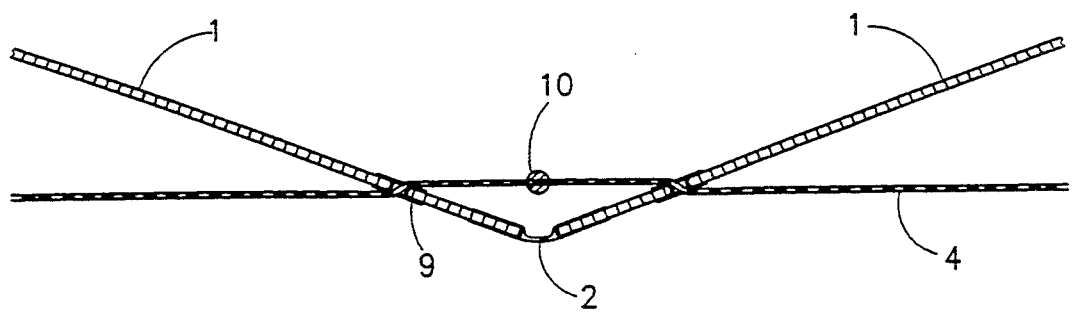
FIG. 6 is a section through a joint between two panels showing a through-going string divided into a plurality of equal length by one bead each attached to the string.

FIG. 6 shows a string 4 extending throughout the length of the cover and passing through reinforced perforations 9 provided in each panel. The string is divided into equal portions by beads 10 firmly fastened to the string by glueing or any other method known to the art.

Figure 7:
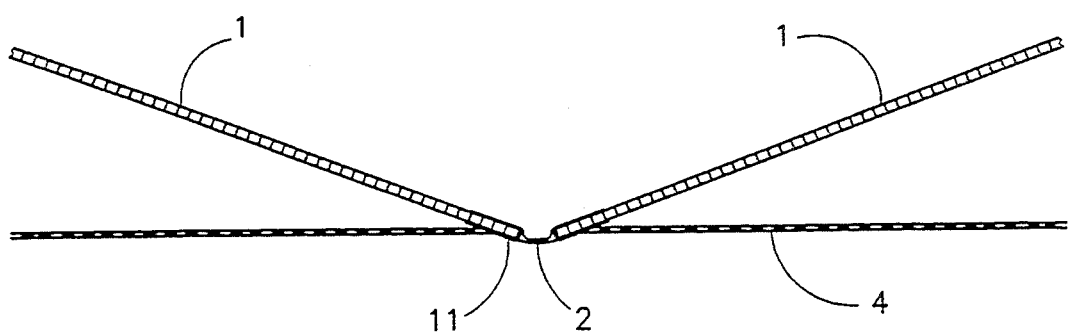
FIG. 7 is a section through a joint between two panels showing two pieces of string attached to the panels.

FIG. 7 shows a similar section as shown in FIG. 6, with short pieces of string 4 attached to the panel corners by any known fastener 11. As in any embodiment of the cover the two strings at oppositee sides of the panel are connected by a length of rubber band or spring, pulling the panels into a stack as soon as the front end of the cover is released.

The advantages of the protective cover of the invention are, first of all, the ease of stretching it over the car body and stowing it away in the baggage compartment and, secondly, the fact that there remain air spaces between the cover and the roof owing to the wavelike form of the cover in expanded state, preventing direct heat convection to the roof surface.

It will be understood that the size and number of the panels as shown in the drawings have ben chosen arbitrarily, and that any number and size of panels can be used to construct a cover suitable for a specific size and shape of car or any other vehicle.

It is also understood that the flexible joint between each two panels may be made in any manner, as long as it permits folding of the panels into a close stack. In the foregoing it was stated that the panels are made of a stiff plastic material, but any other stiff material may be used such as, for Instance, stiff canvas with flexible joints made of the same, but not stiffened material.

What is claimed is:

1. A protective cover for a motor vehicle in the form of a strip of a length commensurate with the length of said motor vehicle and of a width slightly smaller than the width of the baggage compartment of said motor vehicle, said cover comprising, a plurality of rectangular stiff panels connected along their long sides by flexible joints, permitting said cover to be folded into a close stack and to be stored inside the baggage compartment of said motor vehicle and to be pulled out and to be stretched over the body of said motor vehicle, wherein said strip is provided with means for attaching a first, near end to the inside of said baggage compartment and with means for attaching its other, far end to the front of said motor vehicle, two lengths of strip or string means having their two ends attached to points proximate two corners of each adjoining pair of said panels, said strip or string means being of a length commensurate with the distance between said points on said panels in fully stretched state of said cover, each of said lengths of strip or string mechanism having a center and elastic means connecting the centers of each two lengths of strip or string means adapted to pull said two strip or string means towards the center line of said cover and thereby pulling each said adjoining pair of panels into mutual contact and all said panels of said cover into a close stack.

2. The protective cover of claim 1, wherein said string or strip means are non-elastic strings.

3. The protective cover of claim 2, wherein each adjoining pair of panels are connected by lengths of strings having their respective ends firmly connected to said points proximate said corners of said panels.

4. The protective cover of claim 2, wherein two long strings extend through perforations in said panels and are divided into equal length portions by beads or knobs fastened to said strings close to said perforations, and wherein said elastic means connect the centers of each two corresponding portions between said beads or knobs.

5. The protective cover of claim 4, wherein said two long strings extend beyond the near end and beyond the far end of said cover.

6. The protective cover of claim 5, wherein the string ends extending beyond the near end serve for attaching said cover to the inside of said baggage compartment.

7. The protective cover of claim 5, wherein the string ends extending beyond the far end are provided with hook means for attaching said strings to the bumper of said motorcar.

8. The protective cover of claim 1, wherein said elastic means are rubber bands.

9. The protective cover of claim 1, wherein said elastic means are tension springs.

10. The protective cover of claim 1, wherein said cover is in the form of a long, continuous strip of a stiff plastic material and wherein said flexible joints are formed by evenly spaced furrows pressed into the plastic material.

11. The protective cover of claim 1, wherein said cover consists of separate panels connected by flexible joints in the form of pieces of a flexible material attached to the edges of adjoining panels.

12. The protective cover of claim 1 wherein said cover consists of a long strip of a flexible material having panels of a stiff material attached to said flexible material.

13. The protective cover of claim 1, wherein curtains are attached to the side edges of said cover which are adapted to cover the sides of said motorcar and to be folded Into said baggage compartment.

* * * * *